United States Patent [19]

Chiodo

[11] Patent Number: 4,468,874
[45] Date of Patent: Sep. 4, 1984

[54] IDENTIFICATION LOCKET

[75] Inventor: Rudolph J. Chiodo, West Hempstead, N.Y.

[73] Assignee: Dimedco, New Rochelle, N.Y.

[21] Appl. No.: 456,714

[22] Filed: Jan. 10, 1983

[51] Int. Cl.³ .............................................. G02B 27/04
[52] U.S. Cl. ....................................... 40/365; 350/140
[58] Field of Search ................. 40/365, 362, 366, 367, 40/10 R; 63/19, 18; 350/140, 250; 352/129

[56] References Cited

U.S. PATENT DOCUMENTS

| | | | |
|---|---|---|---|
| 277,022 | 5/1883 | Gould | 63/18 |
| 296,741 | 4/1884 | Gould | 63/19 |
| 1,063,209 | 6/1913 | Ording | 63/18 |
| 2,334,483 | 11/1943 | Dennis | 350/140 |
| 2,426,888 | 9/1947 | Langberg | 40/365 |
| 2,602,366 | 7/1952 | De Liso | 40/365 |
| 2,615,366 | 10/1952 | Rothweiler | 88/24 |
| 2,842,027 | 7/1958 | Betti | 350/140 |
| 2,943,409 | 7/1960 | Maiershofer | 40/63 |
| 3,076,276 | 2/1963 | Pitchford | 40/106.1 |
| 3,178,842 | 4/1965 | Zimmerman | 40/10 |

FOREIGN PATENT DOCUMENTS 919127  2/1963  United Kingdom ................ 350/140

Primary Examiner—John J. Wilson
Attorney, Agent, or Firm—Fitzpatrick, Cella, Harper & Scinto

[57] ABSTRACT

An improved identification locket having magnifying lens, a case, a frame for retaining a transparent transcript and means for opening and closing the case, also includes a support for maintaining the lens at a fixed distance from the frame and for preventing movement between the cover and frame in the open position. The support includes a first and second slotted arm attached to a first and second slide pin; each arm having a keeper for lockingly retaining the slide pin when the locket is in the open position.

1 Claim, 5 Drawing Figures

IDENTIFICATION LOCKET

BACKGROUND OF THE INVENTION

1. Field of the Invention

The present invention relates to an improved device designed to be carried on the person and which contains medical as well as personal information for completely identifying the person carrying the device. More specifically, the device provides facilities for protectively encasing and storing a relatively large amount of pertinent identification information in a compact manner and instantaneously displaying the information in a readily readable form.

Personal identification is no longer a matter of merely determining the name and address of a person. The medical profession has long recognized the need for an identification record to be carried on the person that would provide pertinent medical information pertaining to that person. The current emphasis on civil defense and precautions that must be taken to meet the possibility of a nuclear holocaust underlines the necessity for a device which would furnish the means for carrying such information in a practical manner. To fill this need, an identification locket is provided which may conveniently be carried on the person and which contains the desired identification information. In case of a catastrophe or any emergency where a person would require immediate medical treatment, the device of the invention would instantaneously provide information concerning allergies to foods, chemicals or specific drugs so as to prevent the administration of compounds having the potential to induce anaphylactic shock as penicillins, cephalosporins, aminoglycosides, sulfur compounds, antitoxins, cortisone or related steriods and the like. Information pertaining to blood type and to conditions such as diabetes, epilepsy, glaucoma, hemophilia, multiple sclerosis and cardiac conditions may also be recorded in the device. In addition, if the owner of the device normally wears eye glasses, his prescription may be recorded. If the carrier of the device is taking anticoagulants, is wearing an artificial larynx because of surgery, is wearing contact lenses or is engaged in some occupation that may have some specific effect upon his physical condition such as, for example, deep sea diving, these special circumstances may be recorded in the device so that a treating physician would immediately have access to information that could save the life of the person carrying such a device.

2. Description of the Prior Art

A device for accessing such information is described in U.S. Pat. No. 3,178,842. However, the device illustrated therein lacks proper support when opened for use. In addition, medical histories to be complete may require not only a medical transcript, but a typical EKG or EEG reading or the like. Such a reading or standard must be separately accessible from the transcript for comparison to a contemporaneous reading, for microfilming and enlarging or for transmission by facsimile or the like to another facility to allow consultations.

SUMMARY OF THE INVENTION

A primary object of the invention is to provide a compact device which will store a great deal of medical as well as personal identification information and will instantaneously display the information in a readily readable and stably supported form.

Another object of the invention is to provide a device which will protect and preserve more than one frame of information, while being easily and conveniently carried on the person.

The invention may briefly be described as an identification locket for storing and instantaneously displaying a miniature transcript of a record of identification information, the locket comprising a case capable of being opened and closed and having a magnifying lens as an element thereof, and means for mounting the transcript for movement between a closed position wherein the transcript is protectively encased within the case when the case is closed and an open position wherein the transcript is located at a fixed distance from the lens when the case is open so that the transcript may be read through the lens by the naked eye.

BRIEF DESCRIPTION OF THE DRAWING

The novel features of the invention, as well as additional objects and advantages thereof, will be more fully understood from the following description of a preferred embodiment thereof, when read in conjunction with the accompanying drawings in which.

Figure 1:
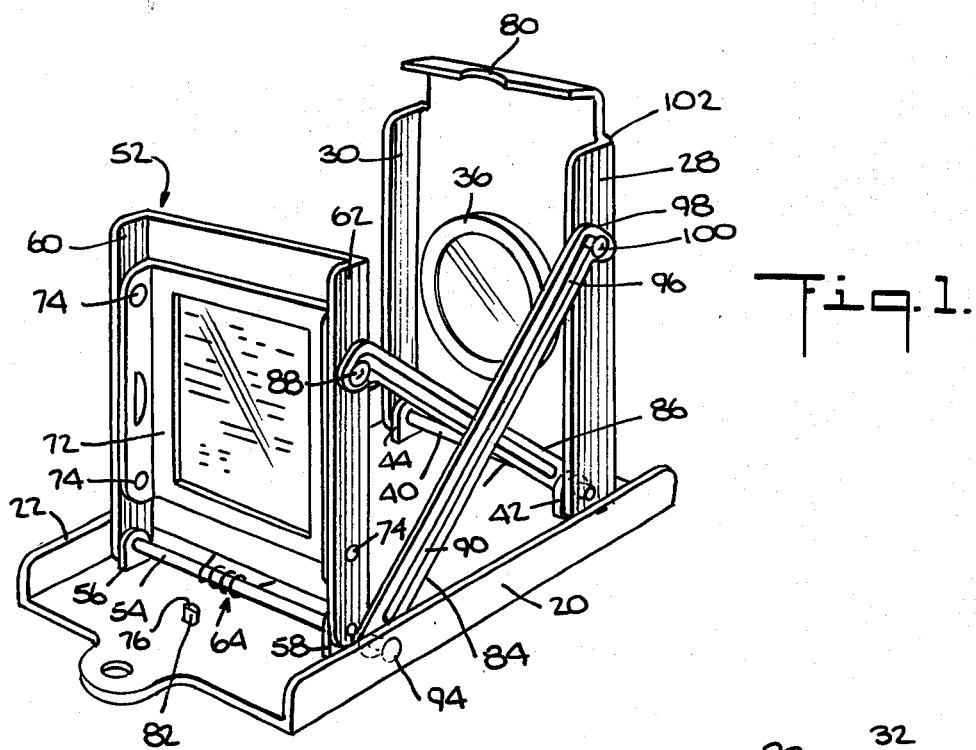
FIG. 1 is a perspective view of the identification locket in an open configuration.
Figure 2:
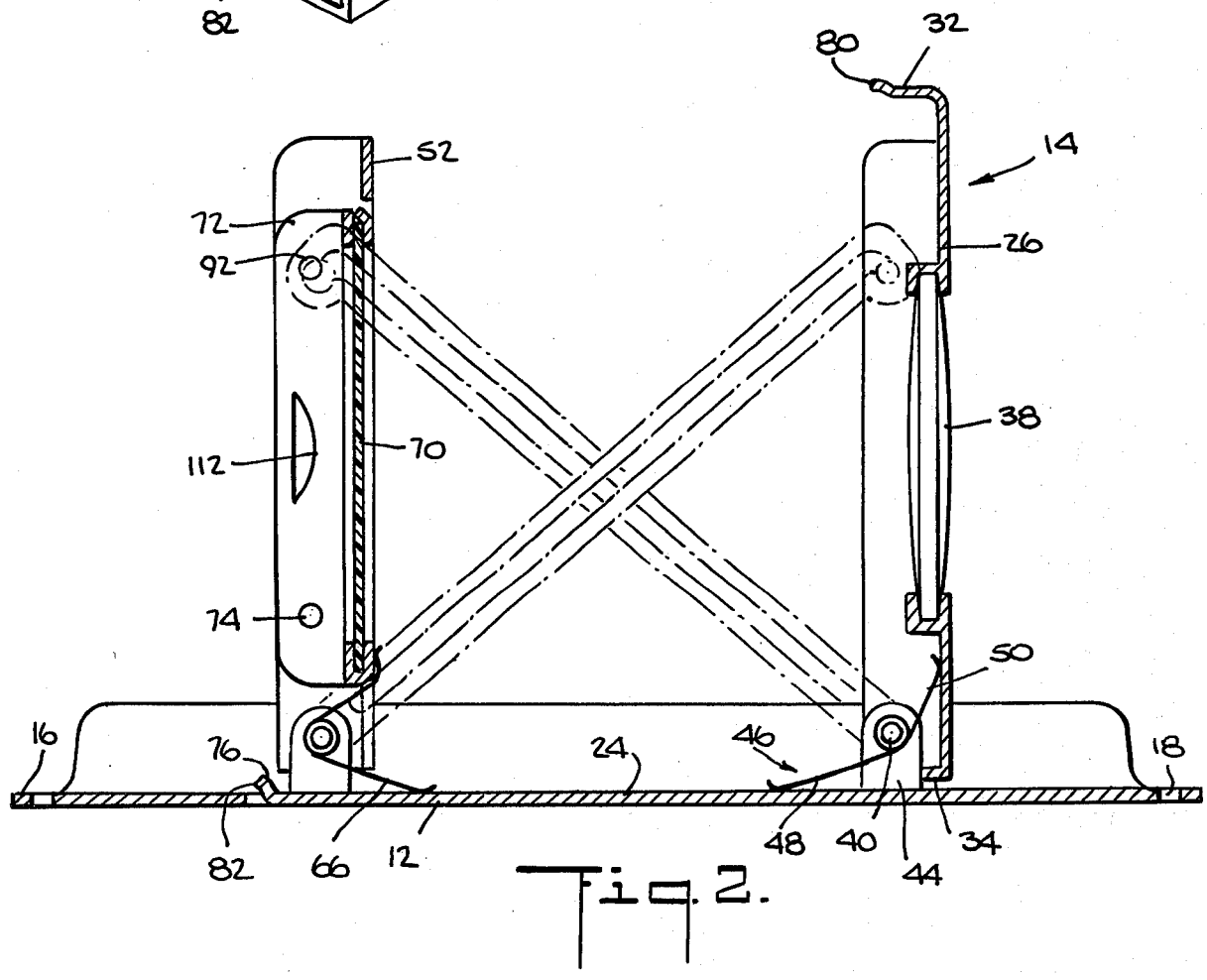
FIG. 2 is an enlarged cross-sectional elevational view of the locket.
Figure 3:
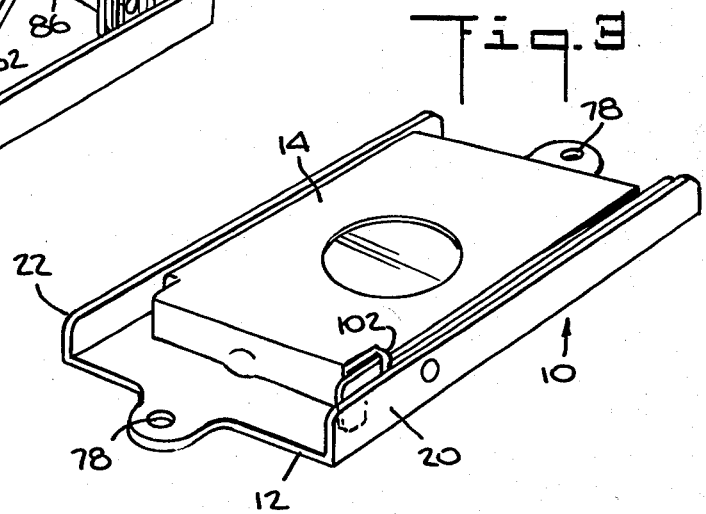
FIG. 3 is a perspective view of the identification locket in a closed configuration.

The embodiment of the invention illlustrated in the FIGS. 1 through 3 is comprised of a case 10 having a back and a cover indicated generally at 12 and 14 respectively, and means for mounting a miniature transcript of a record of identification information for movement between a closed position wherein the transcript lies enveloped in the case and an open position as will be more particularly pointed out hereinafter. As may readily be seen in FIGS. 1 and 2, back 12 has opposite ends 16 and 18, opposite sides 20 and 22 and bottom 24. Sides 20 and 22 are walls formed integral with bottom 24 and are substantially perpendicular to bottom 24.

Cover 14 is made up of face 26, opposite sides or walls 28, 30 and ends 32 and 34. An aperture 36 is formed in the face of the cover and a magnifying lens 38 is mounted therein. A shaft 40 passes through a pair of shaft receptacles, 42, 44 mounted on bottom 24 adjacent cover walls 28, 30 and thereafter through walls 28, 30 of the cover. Shaft 40 serves to mount the cover on the back for pivotal movement between an open position as shown in FIG. 1 and a closed position as shown in FIG. 3. The ends of shaft 40 are slightly enlarged to hold the shaft in place in the assembly. A helical spring 46 encircles shaft 40 with one leg 48 abutting bottom 24 and the other leg 50 pressing against the inner surface of face 26 to resiliently urge cover 14 into its open position substantially perpendicular to back 12.

Frame 52 is likewise mounted for pivotal movement adjacent end 16 of back 12 by means of shaft 54 passing through shaft receptacles 56, 58 mounted on bottom 24 and thereafter through adjacent frame flanges 60, 62. A helical spring 64 is located on shaft 54 with spring leg 66 abutting bottom 24 and spring leg 68 pressing against frame 52 and resiliently urging the frame toward an open position substantially perpendicular to back 12 and parallel to cover 14.

Mounted in frame 52 is a microfilm transcript 70 of a record of identification for the information locket. In addition to personal identification information such as name, address, social security number and the like, medical information concerning any illnesses, ailments allergies, conditions or any other facts that may be of interest to a treating physician in case of emergency as hereinbefore more particularly pointed out are recorded in the transcript. While the transcript is relatively small, i.e., one-half inch wide by three-quarter inch high at the most, a great deal of information may be stored on the transcript due to the miniature nature of information recorded on microfilm. The microfilm transcript is accurately located in the frame laterally by flanges 60, 62. Frame-like retainer 72 is pressed against transcript 70 and releasably held in place by detents 74. In this way transcript 70 is fixed on frame 52 but may be removed and replaced when necessary to keep the record of information up to date.

The identification locket is designed to be carried on the person in a closed configuration as illustrated in FIG. 3. When the locket is closed, frame 52, carrying transcript 70, is pivoted until the frame lies parallel to the back 12 and is nestled between sides 20, 22. Cover 14 is pivoted until it lies parallel to back 12, with sides 20, 22 of the back overlapping walls 28, 30 of the cover. The cover and back thus form a protective case in which the transcript is enveloped and stored until such times as it may be needed. Catch 76 may be provided to keep the cover and frame in a closed position against the force of helical springs 46 and 64. Lip 80 on cover 14 is urged over catch 76 and is restrained against further movement by bottom face 82 of catch 76. Eyes 78 are provided at either end of the back to facilitate the carrying of the locket case by the owner. The locket may be attached to a chain and worn like a charm on the wrist or around the neck or it may be carried on a key chain or in a case. In addition, a pin or clip (not shown) may be fastened to the back to fix the locket onto an article of clothing.

To open the locket for use, one need only insert a fingernail under the lip 80 formed in end 32 of the cover to force the release of catch 76 and allow the cover and frame to be urged into proper open position by the helical springs. Since the locket is relatively small, it is necessary to accurately maintain a fixed distance between the lens and the transcript so that proper magnification will be accomplished. Thus, it is necessary to effectively fix the position of cover 14 and frame 52 and accurately determine the distance between the lens and the transcript. For this purpose at least one pair of slotted arms 84, 86 is provided. As shown in FIG. 1, arm 86 is pivotally mounted at one end on shaft 40 adjacent shaft receptacle 42. Arm 86 is retained in an open position abutting flange 62 by slide pin 88 which is the head of detent 74. A slot 90 extends the length of the arm and terminates in a right angle notch 92 for retaining pin 88 and for locking arm 86 and frame 52 in an open position under positive urging from helical springs 46 and 64. Arm 84 is pivotally mounted on a portion of frame shaft 54 spaced between the base of flange 62 and side 20 of the back 12. An enlarged head 94 is provided on shaft 54 to secure it to side 20. A slot 96 terminating on a right angled notch 98 is provided in arm 84, to capture slide pin 100 which protrudes from wall 28 and acts to retain arm 84 in an open position under the positive urging of helical springs 46 and 64.

Figure 4:
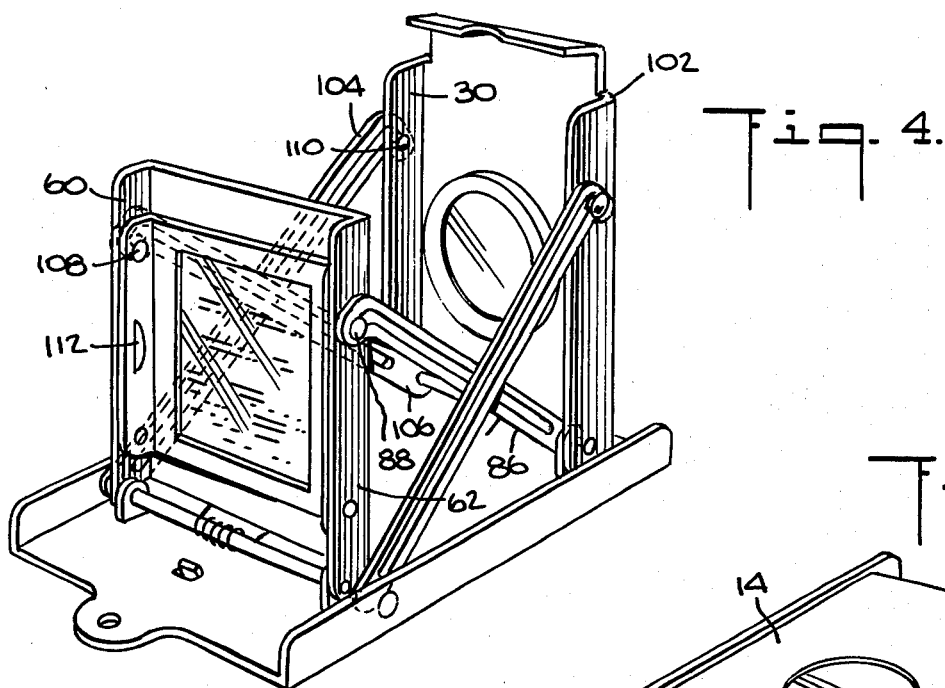
FIG. 4 is a perspective view of a second embodiment of the locket in an open configuration.

When inward pressure is applied to frame 52 and cover 14, slide pins 88 and 100 ride slots 86 and 96, respectively and allow both the frame to collapse onto bottom 24 and the cover lip 80 to engage catch 76. Arm 86 is retained in the closed position in the space between flange 62 and side 20. Notch 92 is carried in neck 102 between wall 28 and cover end 32. Arm 84 is retained in its closed position in the space between flange 62, wall 28 and side 20. A second embodiment of the invention is illustrated in FIG. 4 in which a second pair of arms 104, 106 are pivotally mounted on the other side of the locket to provide additional support upon opening to more accurately maintain a fixed distance between the lens and transcript. For this purpose, a second pair of slide pins 108, 110 are attached to flange 60 and cover wall 30.

Figure 5:
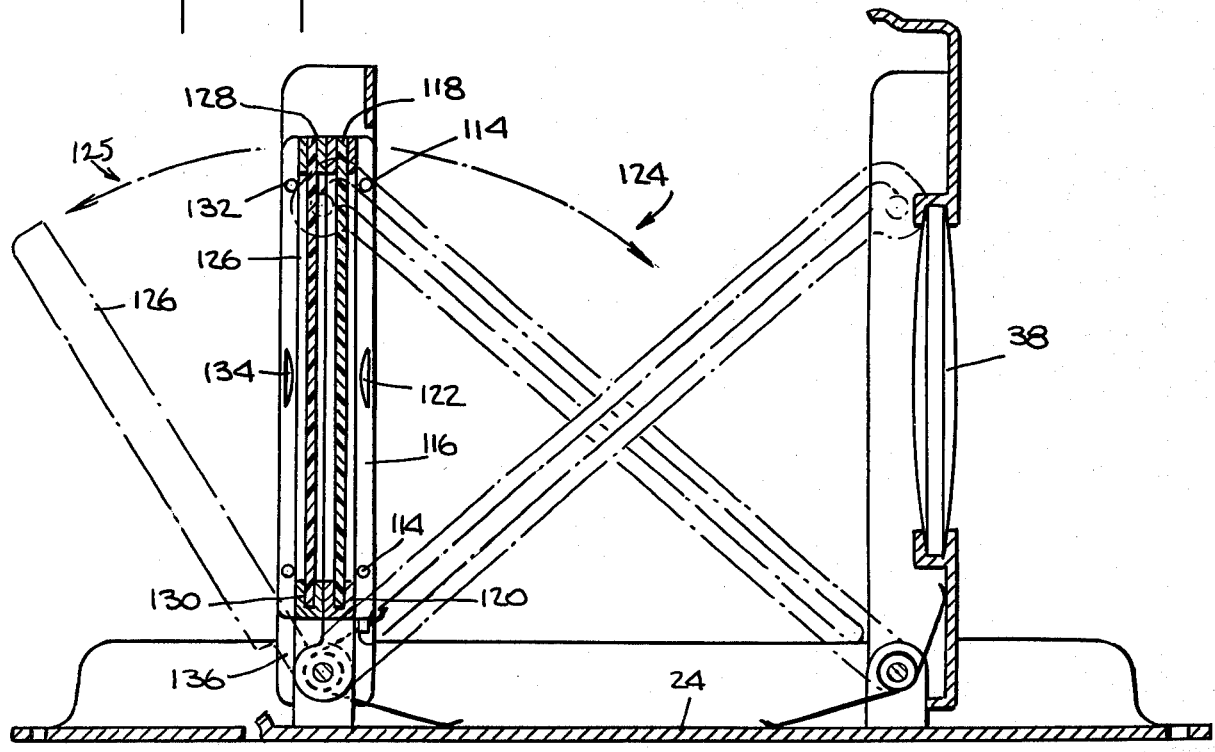
FIG. 5 is an enlarged, cross-sectional elevational view of a third embodiment of the locket.

If desired, in a third embodiment, a second retainer carrying a second transcript may be provided abutting retainer 72. For this purpose a D-shaped slot 112 is provided through an inside wall of retainer 72 to allow a second retainer to be moved out of a first position abutting the first transcript in order to view the first transcript without also looking through the second transcript. Such an embodiment is illustrated in FIG. 5. In order to permit a pair of transcripts to be detachably mounted to frame 52, a first set of detents 114 releasably hold first retainer 116 carrying a first transcript 118 in groove 120 on flange 62. A second set of detents 114', not shown, are spaced on flange 62 to hold the other side of the first retainer. Retainer 116 is provided with a leg portion which is pivotally mounted on shaft 54. A D shaped notch 122 in flange 62 permits a fingernail or the like to be inserted for urging the first retainer and transcript from an erect viewing position in said frame to a non-viewing position in the bottom 24 of case 10 (as shown by arrow 124). This rotational movement accesses the second transcript for viewing directly through the lens.

A second retainer 126 carries second transcript 128 in groove 130 and is releasably mounted in frame 52 on flanges 60 and 62 by another series of detents 132 and 132' (not shown). A second D shaped notch 134 is provided to urge the second retainer and transcript from a first position abutting retainer 116 to a second position, parallel to bottom 24 shown by arrow 125 to permit the first transcript to be viewed without interference from the second set of information on the second transcript. For this purpose a leg portion 136 is provided in retainer 126 which is pivotally mounted on shaft 54.

As shown in FIG. 1 construction of frame 52 and retainer 72 is such that any available light is allowed to pass through the microfilm transcript. Lens 38 is then in proper position to magnify the record of information appearing on the transcript 70 and all of the information may be read through the lens by the naked eye.

The component parts of the locket are preferably fabricated of metal to ensure rugged construction. The lens is formed of Plexiglas, polycarbonate or other suitable plastic materials of an unbreakable or shatter-proof nature. Stainless steel or nickel plated brass construction may be employed to provide a utilitarian, corrosion resistant structure while gold or silver plated parts may be employed for a more decorative locket.

Through the use of a minimum number of component parts arranged in the fashion illustrated, a small but effective device has been produced. The overall dimensions of the locket can be no more than one and one-half to one and three-quarter inches in length and about three-quarter inch in width with a thickness of less than one-quarter of an inch. The lens itself need be only about one-half inch in diameter. The embodiment of the invention illustrated and described above is given by way of example only and is not intended to restrict the true spirit and scope of the invention as expressed in the appended claims.

I claim:

1. An identification locket for storing and displacing miniature transparent transcripts of identification information, said locket comprising:
   (a) a case having a back and a cover, the cover being mounted on a first shaft positioned adjacent one end of said back for rotation between a closed position wherein the cover is parallel to said back and is positioned between the one end and the other end of said back, and an open position wherein the cover is perpendicular to said back;
   (b) a magnifying lens mounted in said cover;
   (c) a frame mounted on a second shaft positioned adjacent the other end of said back for rotation between a closed position wherein the cover is parallel to said back and between the ends of said back, and an open position wherein the cover is perpendicular to said back, wherein said frame is enveloped between the back and said cover when said frame and cover are in the closed position, said frame having a pair of parallel edge flanges and a wall therebetween, the flanges having detent means and the wall having an opening;
   (d) a first retainer for releasably holding in a predetermined position therein a first transparent transcript, said first retainer being removably held to said frame by the detent means and rotatable independent of said frame about the second shaft between the closed position of said frame and the open position of said frame;
   (e) a second retainer for releasably holding in a predetermined position therein a second transparent transcript, said second retainer being removably held to said frame by said detent means and rotatable independent of said frame and said second retainer about the second shaft between the closed position of said frame, the open position of said frame, and a third position parallel to the back of said casing and opposite to the closed position, wherein said first and second retainer abut each other and both are perpendicular to said back when said first and second retainer are in the open position, and wherein said first and second transparent transcripts are displayed simultaneously and parallel to said magnifying lens when said first and second retainer are in the open position, said first transparent transcript is displayed when said first retainer is in the open position and said second retainer is in the third position, said second transparent transcript is displayed when said second retainer is in the open position and said first retainer is in the closed position, and neither said first nor said second transparent transcripts are displayed when said first and second retainers are in the closed position;
   (f) first spring means for urging said cover toward the open position;
   (g) second spring means for urging said frame toward the open position; and
   (h) support means for maintaining said frame at a fixed distance from said cover and for preventing movement between said frame and cover when said frame and cover are in the open position.

* * * * *